UNITED STATES PATENT OFFICE.

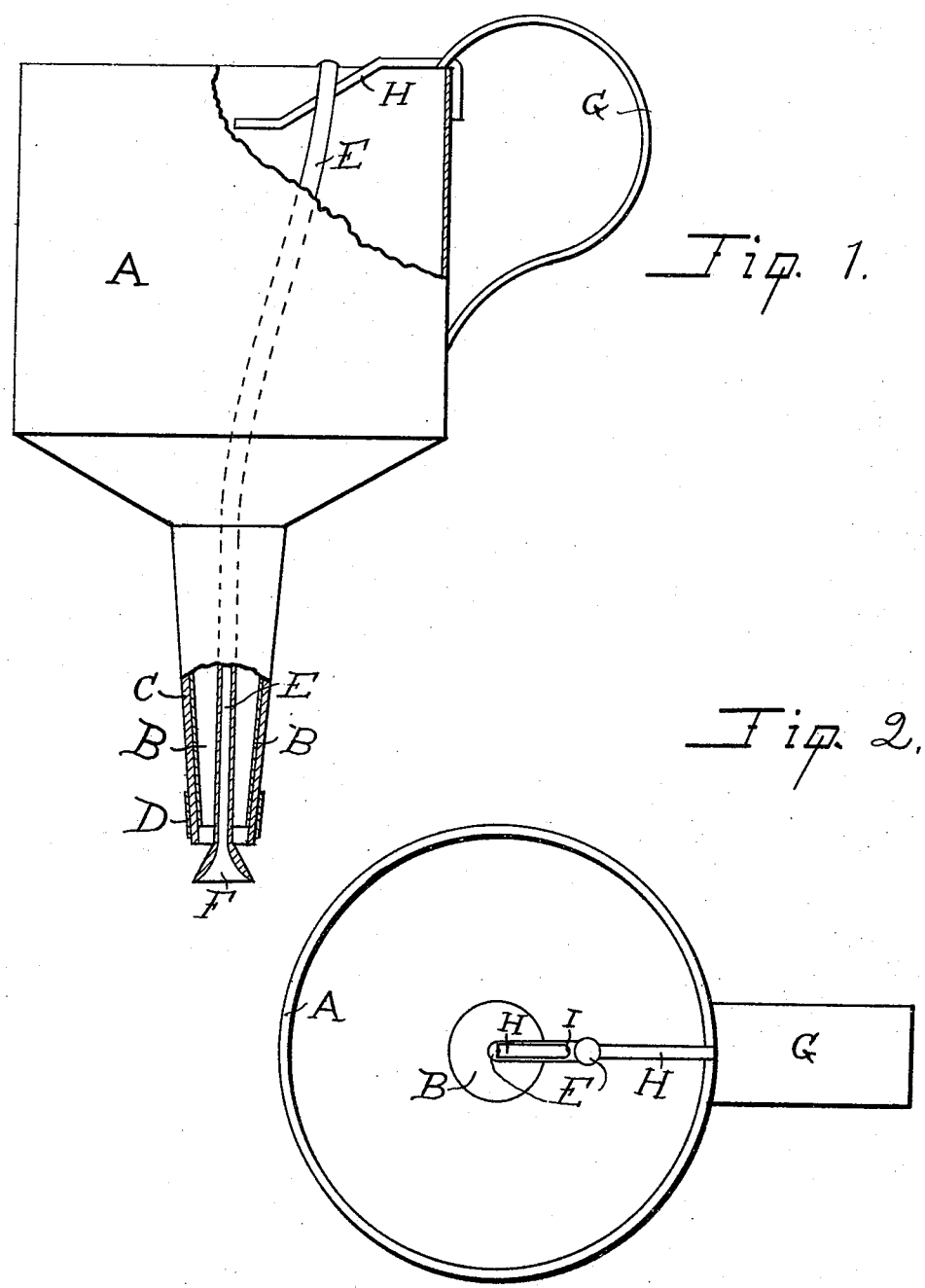

AARON G. DYER, OF SAN FRANCISCO, ASSIGNOR TO PERCY P. COX, OF STOCKTON, CALIFORNIA.

FUNNEL.

SPECIFICATION forming part of Letters Patent No. 552,240, dated December 31, 1895.

Application filed April 23, 1895. Serial No. 546,944. (No model.)

*To all whom it may concern:*

Be it known that I, AARON G. DYER, a citizen of the United States, residing at San Francisco, in the county of San Francisco and State of California, have invented certain new and useful Improvements in Funnels for Conducting Liquids into Bottles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in funnels for conducting liquids into bottles; and it consists in a funnel of ordinary construction having a stopple at the lower end of the spout and such other devices and combination of devices as will be more fully explained in the specification and explicitly pointed out in the claims, reference being had to the accompanying drawings, in which—

Figure 1 is a side elevation of my improved funnel partly in section. Fig. 2 is a top plan view of the same.

Similar letters of reference indicate corresponding parts throughout both views.

A represents the body of a funnel, and B represents the spout of the same.

C is a casing of rubber or other like material which is attached to the outside of the spout B, and adapted to engage tightly with the neck of the bottle into which it is inserted, thus preventing any liquid from escaping, such casing C projecting beyond the end of the spout B.

D is a ferrule which is attached to the outside and near the lower end of the casing C, such ferrule D having its lower edge at a point midway between the lower ends of the casing C and of the spout B.

E is a hollow tube which extends through the entire length of the funnel and spout into the vessel which is to be filled. Such tube E is provided at its lower end with a bell-shaped stopple F, having its lower edge of greater diameter than the diameter of the casing C for the purpose of retaining the remaining liquid in the funnel after the vessel has been filled. The tube E is provided with a slot I at its top for the purpose of allowing the air to escape from the vessel while being filled. Such slot also engages with a curved arm H for the purpose of maintaining the tube E and stopple F is such position as is desired.

G is a handle.

The mode of operating my improved funnel is as follows: The operator grasps the handle G, and inserts the spout B into the bottle or other vessel, and after the tube E has been pressed downward the liquid is poured into the body A of the funnel and the bottle is filled. Should any surplus liquid be poured into the funnel, it cannot escape by reason of the rubber casing fitting closely inside the neck of the bottle. The air escapes through the tube. Then the thumb is pressed against the top end of the tube E, pulling the same against the side of the body of the funnel, thus raising the tube E, when the bell-shaped stopple F will be pressed against the bottom of the rubber casing C, thus preventing any liquid from escaping through the spout B until the same is transferred to another vessel and the tube E is again depressed.

Having thus described my invention, what I claim as new, and desire to secure by Letters Patent, is—

1. In a funnel of the class described, the combination with the body A and spout B of a casing of flexible material attached on the outside of the spout B such casing extending beyond the lower end of the spout B, a hollow tube extending from the top of the funnel downward, a bell-shaped stopple attached to the lower end of such tube and adapted to be raised and lowered at will, all arranged and operating substantially as shown and described.

2. In a funnel of the class described the combination with the body A and the spout B of the casing of flexible material attached to the outside of the spout B, such casing extending beyond the lower end of the spout B, the ferrule D adapted to engage the casing near its lower end the lower end of such ferrule D being midway between the lower ends of the spout B and the casing, the hollow tube E having the bell-shaped stopple F which is adapted to engage the casing C at the lower
5 end, the slot I adapted to engage the arm H, and the arm H attached at the top of the funnel, all arranged and operating substantially as shown and described.

In testimony whereof I affix my signature in presence of two witnesses.

AARON G. DYER.

Witnesses:
A. E. KATSCH,
WALTER A. BATES.